(12) United States Patent
Goddard et al.

(10) Patent No.: US 10,667,891 B2
(45) Date of Patent: Jun. 2, 2020

(54) RESONANCE TUNING OF THE BRISTLE STRUCTURE FOR A POWER TOOTHBRUSH

(71) Applicant: KONINKLIJKE PHILIPS N.V., Eindhoven (NL)

(72) Inventors: Gregory Russ Goddard, Kenmore, WA (US); Kip Shirey, Monroe, WA (US); Lisa Bethany Schmalhurst, Issaquah, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 290 days.

(21) Appl. No.: 15/309,513

(22) PCT Filed: May 11, 2015

(86) PCT No.: PCT/IB2015/053443
§ 371 (c)(1),
(2) Date: Nov. 8, 2016

(87) PCT Pub. No.: WO2015/177675
PCT Pub. Date: Nov. 26, 2015

(65) Prior Publication Data
US 2017/0181820 A1    Jun. 29, 2017

Related U.S. Application Data

(60) Provisional application No. 62/001,659, filed on May 22, 2014.

(51) Int. Cl.
*A61C 17/34* (2006.01)
*A46B 9/04* (2006.01)
(Continued)

(52) U.S. Cl.
CPC ............ *A61C 17/3481* (2013.01); *A46B 9/04* (2013.01); *A46B 13/023* (2013.01);
(Continued)

(58) Field of Classification Search
CPC .. A46B 9/04; A46B 9/06; A46B 13/00; A46B 13/02; A46B 13/023; A46B 2200/1066; A61C 17/22; A61C 17/32; A61C 17/34; A61C 17/2409; A61C 17/2481; A61C 17/3409; A61C 17/3481; A46D 1/00; A46D 1/02; A46D 1/0269
USPC ..................... 15/22.1, 167.1, 207.2
See application file for complete search history.

(56) References Cited

U.S. PATENT DOCUMENTS 3,196,299 A  *  7/1965  Kott .................. A61C 17/3481
                                                              15/22.1
3,335,443 A     4/1967  Parisi et al.
(Continued)

FOREIGN PATENT DOCUMENTS

CN          2684786 Y       3/2005
WO          9315628 A1      8/1993
WO          2005058190 A1   6/2005

*Primary Examiner* — Mark Spisich

(57) ABSTRACT

A brushhead assembly (10) for a power toothbrush (1), which includes a bristle plate (12) and a set of bristles (14) mounted to the bristle plate (12). The set of bristles (14) is characterized such that some or all of the bristles have a dipole whip motion during operation at a selected drive frequency, including arrangements where the bristles in a first portion (32) have a different motion than the bristles at a at least a second portion (34) of the brushhead assembly (10).

12 Claims, 1 Drawing Sheet

(51) Int. Cl.
  *A46B 13/02* (2006.01)
  *A61C 17/22* (2006.01)
  *A61C 17/20* (2006.01)
  *A46B 15/00* (2006.01)
  *A61C 17/16* (2006.01)

(52) U.S. Cl.
  CPC .......... *A46B 15/0028* (2013.01); *A61C 17/22* (2013.01); *A61C 17/222* (2013.01); *A61C 17/16* (2013.01); *A61C 17/20* (2013.01)

(56) References Cited

U.S. PATENT DOCUMENTS

| | | |
|---|---|---|
| 3,840,932 A | 10/1974 | Balamuth et al. |
| 5,305,492 A | 4/1994 | Giuliani et al. |
| 5,378,153 A | 1/1995 | Giuliani et al. |
| 5,533,227 A * | 7/1996 | Ito .......................... A46B 9/04 15/167.1 |
| 5,797,158 A * | 8/1998 | Hoshizaki ................ A46B 3/08 15/167.1 |
| 6,035,476 A * | 3/2000 | Underwood ........... A46B 9/045 15/167.1 |
| 7,392,562 B2 | 7/2008 | Boland et al. |
| 7,520,016 B2 | 4/2009 | Kressner |
| 7,549,186 B2 | 6/2009 | Geiberger |
| 7,640,614 B2 | 1/2010 | Brown et al. |
| 7,774,885 B2 | 8/2010 | Kressner et al. |
| 2003/0154567 A1 | 8/2003 | Drossler et al. |
| 2009/0241276 A1 | 10/2009 | Hall et al. |
| 2011/0107531 A1 | 5/2011 | Ye |
| 2012/0233798 A1 | 9/2012 | Brewer et al. |

* cited by examiner

RESONANCE TUNING OF THE BRISTLE STRUCTURE FOR A POWER TOOTHBRUSH

CROSS-REFERENCE TO PRIOR APPLICATIONS

This application is the U.S. National Phase application under 35 U.S.C. § 371 of International Application No. PCT/IB2015/053443, filed on May 11, 2015, which claims the benefit of U.S. Provisional Patent Application No. 62/001,659, filed on May 22, 2014. These applications are hereby incorporated by reference herein.

TECHNICAL FIELD

This invention relates generally to toothbrush brushhead assemblies, and more specifically concerns the structure and arrangement of bristles and tufts in a power toothbrush brushhead.

BACKGROUND OF THE INVENTION

Conventional toothbrushes typically are arranged to mechanically scrub the surfaces of the teeth to remove dental plaque. A variety of bristle materials, bristle dimensions and bristle geometry have been used to facilitate the cleaning process and are disclosed in many patents. Typically, the bristle design results in a sweeping motion of the bristles over the face of the teeth. Alternatively, arrangements such as shown in U.S. Pat. No. 7,520,016 separately drive regions or portions of the bristle set along different axes simultaneously in attempt to achieve a more efficient or more effective cleaning.

Relative to the toothbrush appliance itself, the natural resonant frequency of the various components of a power toothbrush are typically avoided when the drive frequency for the appliance is selected, due to either detrimental or unpredictable effects on device performance and longevity. Undesirable effects include excessive noise, unpleasant user experience and inadequate cleaning. Early failure of the appliance may be caused by excessive vibration of the drive train. The resonant frequency of the handle is the most significant component frequency, although the resonant frequency of the brushhead is usually considered as well. It is typically best practice to avoid matching the resonant frequencies of these two major components.

The effect of the resonant frequency on motion of the bristles has not been heretofore thoroughly investigated relative to cleaning efficiency and/or effectiveness, since the motion has heretofore been primarily determined by the structure of the brushhead itself. A thorough investigation of various aspects of the bristles themselves may, however, result in more effective cleaning while avoiding the performance disadvantages mentioned above. Hence, it would be desirable to improve appliance performance by determining various advantageous structural aspects and arrangements of bristles construction and attachment.

SUMMARY OF THE INVENTION

Accordingly, the brushhead structure for a power toothbrush, comprises: a bristle plate; and a set of bristles mounted to the bristle plate, wherein the set of bristles is characterized structurally by length and stiffness or the mounting of the bristles to the bristle plate, such that bristles in one or more portions of the bristle set have a dipole motion at a selected drive frequency in the sonic range of frequencies.

BEST MODE FOR CARRYING OUT THE INVENTION

Figure 1A:
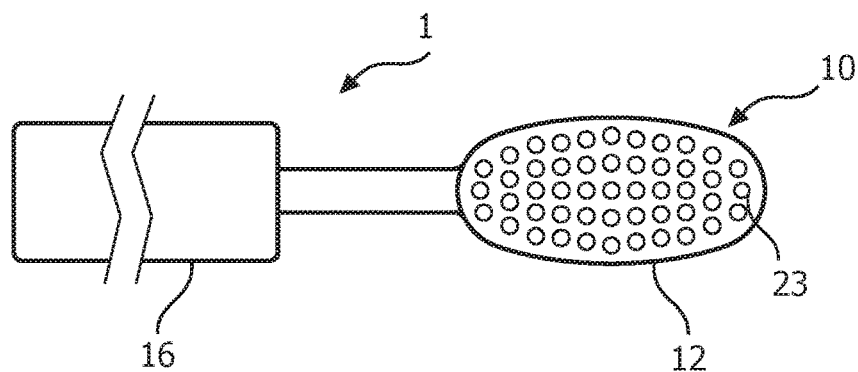
FIG. 1A is a schematic view of a brushhead with a set of bristles driven by a generalized power source.
Figure 1B:
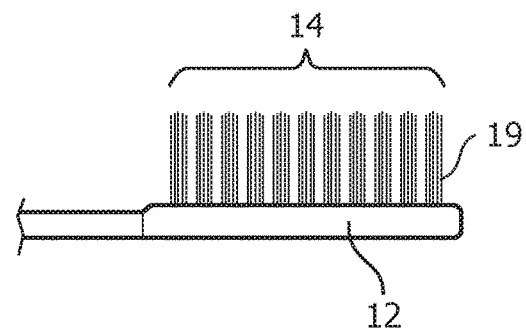
FIG. 1B is an elevational view of the brushhead of FIG. 1A.

FIGS. 1A and 1B show a conventional brushhead assembly 10 of a power toothbrush (1), which includes a bristle plate 12 and a set of bristles 14. The bristles are typically made from nylon and have selected dimensions. The bristle set comprises a plurality of bristle tufts 23, each bristle tuft including a number of individual bristles 19 in the range of 1-1,000,000 bristles. Typically, there are between 10 and 50 bristle tufts in a conventional brushhead. The bristles 19 are attached to the bristle plate in various ways, including, for instance, stapling. The brushhead assembly 10 is driven by a power assembly, which is shown generally at 16. The power assembly is typically housed in a handle portion of the appliance (not shown) and drives the brushhead and the bristles at a selected frequency and amplitude. One example is a frequency of approximately 260 Hz with an amplitude of 10°. These values can, however, vary, depending on the individual appliance and its purpose.

In the present invention, various aspects of the individual bristles 19, including their mounting in the bristle plate, to produce a particular motion or whip, are disclosed. Further, the structure and arrangement of bristles and bristle plate are selected so as to provide a bristle motion in a tip region of the bristle set different than the bristle motion in a central portion of the bristle set. This leads to more effective and efficient cleaning.

Figure 2A:
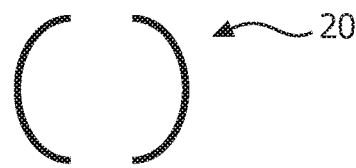
FIG. 2A illustrates a toothbrush bristle having a monopole motion.
Figure 2B:
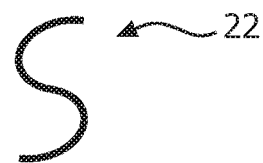
FIG. 2B illustrates a dipole motion.

Conventionally, power toothbrush bristles in operation produce a monopole motion whip, such as shown at 20 in FIG. 2A. This is a first order motion. In the monopole motion, generally "C" shaped, the center of each bristle extends outwardly beyond the ends of the bristle. This motion produces a certain level of cleaning. In one aspect of the present invention, the bristles are configured and arranged to produce a dipole motion or whip, as shown at 22 in FIG. 2B, where the bristles have an "S" motion. This is also referred to as a second order motion.

The individual bristles and bristle tufts are arranged so that the bristles have a dipole motion and further arranged so that the individual bristle tufts do not touch or contact each other, so that the dipole motion of the individual bristles is not disturbed.

In general, the bristle characteristics to produce the dipole motion whip include length and diameter dimensions, material and the number of bristles (packing density) in a selected tuft. The length of the bristles will be on the order of 0.5-1.5 cm, with a diameter within a range of 100-500 µm. The material is relatively soft nylon, such as Tynex. The packing density of the bristles in the individual tufts will be approximately 1,000-10,000/mm. The packing density and the spacing of the tufts can be used to bias the flexation of the bristles toward specific motions, such as a dipole whip.

Figure 3:
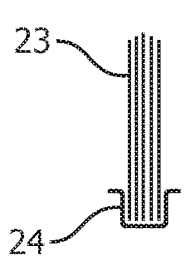
FIG. 3 is a simple cross-sectional diagram showing the attachment of bristles in a brushhead pocket.

The attachment of the bristles to the bristle plate is an important variable. In the embodiment shown, the depth is less than 2 mm, within a range of 0.5-1.5 mm, such as by stapling. The bristle tufts 23 could also be mounted in a brushhead pocket 24, as shown in FIG. 3. This changes the coupling of the bristles relative to the center of mass of the brushhead and can be used to suppress undesired bristle motion and resonances other than the desired resonance.

The material in the bristle plate can be selected to help produce the dipole motion. This includes polypropylene material. Further, the inclusion of lamination fibers, which are positioned parallel to the main axis of the brushhead, stiffens the brushhead in one direction so as to couple energy more directly into the bristles from the brushhead. In manufacturing, the laminate elements could be made as an overmold or a multi-poured injection. Typically, the fibers will be approximately 0.01-1.0 mm in diameter and will extend the length of the brushhead.

Figure 4:
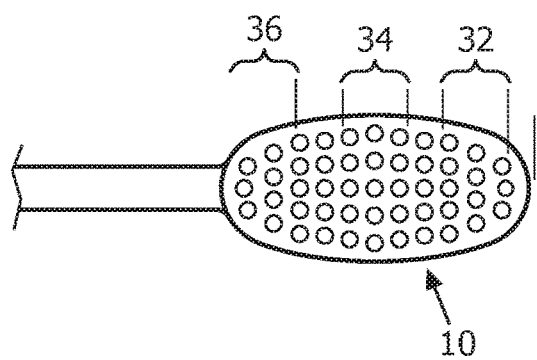
FIG. 4 is a top view of a brushhead illustrating that the phase of bristle motion can vary from region to region of the brushhead

By changing the above characteristics of the bristles in the brushhead, various combinations of sweeping, tapping, swirling or whipping can be achieved at different points on the brushhead. For instance, referring generally to FIG. 4, it may be desirable to arrange the bristles on a brushhead 10 so that a first portion 32 of the bristle set has a different motion than a second portion 34, than a third portion 36. This can improve cleaning, particularly in the interproximal or gingival areas of the teeth. The dimensions of the tip portion and the central portion, respectively, can vary to some extent. A typical example, however, would be that the front 5 mm of the bristle set comprises the first, or tip portion of the bristle set, while the second, or central portion extends for a distance of approximately 15 mm at the center. While the arrangement shown in FIG. 4 shows the first, second and third portions as tip, central and base portions (32, 34, 36), it can be appreciated that the portions can be oriented or arranged in other ways, such as side to side, randomly, or other arrangements, depending on the particular brushhead and arrangement of bristle sets (14) in the brushhead.

Generally, the phase of the bristle motion in one part of the brushhead can be different than the phase of the bristle motion in another part of the brushhead. This can result in various bristle motions, other than the dipole "S" motion described above and below, including circular and elliptical whipping motions, depending on bristle length and stiffness of the bristles and the mounting of the bristles to the brushhead. This permits the kind of whipping seen in elastomeric platens or similar to very long bristles in the midst of shorter bristles, and in particular patterns of bristle tufts other than rows and columns.

In one embodiment, the bristles are structured and arranged to produce a particular out-of-phase motion between the tip portion and the center portion of the bristle set. The tip portion provides a whipping dipole motion, while the center portion has a conventional monopole motion. The action of the tip portion relative to the center portion will vary with frequency. For a brushhead/bristle arrangement, having the following characteristics, i.e. low stiffness and long tufts or vice versa, the movement of the bristles will change as the frequency varies. This demonstrates that a simple change in drive frequency can produce a change in bristle action to accomplish different cleaning actions.

In the brushhead/bristle structural example above, the motion of the tip portion and the center portion will vary as the frequency changes within the sonic range of frequencies, such as for example, over a range of 10-500 Hz. Initially, at a frequency of approximately 100 Hz, there will be a simple whip motion of the power tip. As the frequency increases to approximately 125 Hz, the motion will be a dipole "S" shape, with the center portion moving in sync with the power tip portion, while at a frequency of approximately 150 Hz, the center portion moves out of sync with the tip portion. Further, at a frequency of approximately 200 Hz, the motion will be a double "S", with the center moving in sync with the tip portion, while at a frequency of approximately 220 Hz, the center portion is out-of-sync with the tip portion. Still further, at a frequency of approximately 280 Hz, the motion of the bristles will be a triple "S". This is just one example of how frequency can determine whipping action, within a small range of frequencies.

Bristle motion can be attenuated as the individual bristles contact the teeth, without coupling the vibration to the user. Further, since the bristles are grouped in the form of separate tufts, portions of the bristle set can be stopped by contact with the teeth without stopping the remaining bristle tufts. This allows actual brushing to continue over a wider range of brush/tooth pressure or bristle contact conditions. In some cases, when the vibrational mode is appropriately selected, the motion can be increased for the un-attenuated bristles, which can result in an increase in the efficiency of brushing of the interproximal and subgingival areas.

By changing the coupling of the bristles to the bristle plate, the resonant frequencies of these components can be separated sufficiently to semi-independently drive the bristle tufts apart from the main portion of the bristle plate. Changing the following characteristics of the brushhead can be used to achieve a desired resonant frequency, including, as discussed above, the material properties of the bristle plate and the bristles, the distribution of the tufts, the packing density of the bristles, the depth of stapling and bristle diameter and shape. Changes to the drive frequency and/or the duty factor of the drive signal can be used to achieve a desired motion of the bristles. These changes can be done with a firmware change or various frequencies can be programmed in the appliance to produce different cleaning effects.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A method of cleaning teeth comprising:
   providing a power assembly of a power toothbrush and a brushhead assembly; and
   driving, with the power assembly, a bristle plate of the brushhead assembly at a selected drive frequency within the range of 100-300 Hz, the bristle plate comprising at least two bristle tufts, wherein each bristle tuft includes a plurality of bristles mounted to the bristle plate in at least two portions, wherein a first bristle tuft in a first portion of the bristle plate has a first characteristic such that when driven at the selected drive frequency the first bristle tuft moves in a second order motion and a second bristle tuft in a second portion has a second characteristic such that the second bristle tuft moves in a first order motion and wherein the first characteristic and the second characteristic are chosen from: a depth of the first and second bristle tufts within the bristle plate, a packing density, and a bristle material.

2. The method of claim 1, wherein the bristle tufts in the first portion have a first length and the bristle tufts in the second portion have a second length where the first length is different from the second length.

3. The method of claim 1, wherein the bristle tufts are secured to the bristle plate by means of mounting in pockets in the bristle plate.

4. The method of claim 1, wherein the bristle plate further includes lamination fibers to stiffen the brushhead.

5. The method of claim 4, wherein the lamination fibers are arranged parallel to a main axis of the brushhead.

6. A method of cleaning teeth, comprising:
providing a brushhead assembly comprising a bristle plate having two or more portions; and at least one set of bristles comprising at least two bristle tufts each having a plurality of bristles mounted to each portion of the bristle plate wherein a first bristle tuft of the at least two bristle tufts has a first characteristic and a second bristle tuft of the at least two bristle tufts has a second characteristic different than the first characteristic; and
driving, via a power assembly of a power toothbrush, the brushhead assembly at a drive frequency within the range of 100-300 Hz such that the first bristle tuft in the first portion of the bristle plate moves in a first order motion, while the second bristle tuft in at least one other portion of the bristle plate moves in a second order motion;
wherein the first characteristic and the second characteristic are selected from: a depth of the first and second bristle tufts within the bristle plate, a packing density, and a bristle material.

7. The method of claim 6, wherein the motion of bristle tuft in the second portion is out-of-sync with the motion of the bristle tufts in the first portion.

8. The method of claim 6, wherein the motion of bristle tufts in the second portion movement is in sync with the motion of the bristle tufts of the first portion.

9. The method of claim 6, wherein the bristle tufts in a third portion move differently than the bristle tufts in at least one of the first portion and second portion.

10. The method of claim 9, wherein the motion of the bristle tufts in the third portion is out-of-sync motion with the motion of at least one of the first or second portion thereof.

11. The method of claim 9, wherein the motion of the third portion is in-sync with the motion of at least one of the first or second portion thereof.

12. The method of claim 6, wherein the bristle tufts are arranged so that the bristle tufts do not contact each other during operation of the power toothbrush.

* * * * *